United States Patent [19]
Forgues

[11] Patent Number: 5,852,662
[45] Date of Patent: Dec. 22, 1998

[54] SCRAMBLER BYPASS SYSTEM

[75] Inventor: Scott L. Forgues, Tucson, Ariz.

[73] Assignee: Lucent Technologies Inc., Murray Hill, N.J.

[21] Appl. No.: 678,731

[22] Filed: Jul. 11, 1996

[51] Int. Cl.[6] ...................................................... H04L 9/00
[52] U.S. Cl. ................................................. 380/9; 380/49
[58] Field of Search ................................ 380/2, 9, 33, 49

[56] References Cited

U.S. PATENT DOCUMENTS

| | | | |
|---|---|---|---|
| 4,368,357 | 1/1983 | Gurak | 380/2 |
| 4,914,696 | 4/1990 | Dudczak et al. | 380/49 |
| 4,972,479 | 11/1990 | Tobias, Jr. et al. | 380/33 |

Primary Examiner—Salvatore Cangialosi

[57] ABSTRACT

A cordless phone configured to operate in both a scrambling mode and non-scrambling mode comprises a base station and a cordless handset terminal. Both the base station and the cordless handset terminal include voice scrambler circuits for scrambling and descrambling audio signals. Each of these voice scrambler circuits includes a bypass switch that when activated is adapted to couple audio signals from the input terminal of each scrambler circuit to the output terminal of each scrambler circuit via a bypass route. When the cordless phone operates in its non-scrambling mode, the audio signals are not affected by the internal circuitry of the voice scrambler circuits, leading to a substantially improved voice quality.

15 Claims, 2 Drawing Sheets

SCRAMBLER BYPASS SYSTEM

FIELD OF THE INVENTION

This invention relates to a bypass system employed in electronic systems that use a voice scrambler, and specifically to a bypass system employed in a cordless telephone.

BACKGROUND OF THE INVENTION

Recently a new generation of cordless phones have come to the market, which employ voice scrambler circuits to provide some degree of privacy. Most of these cordless phones allow the user to either communicate in a scrambling mode or a non-scrambling mode. A cordless telephone includes a base station and a handset terminal. Cordless phones with voice scrambling feature include a voice scrambler system in the base station and another voice scrambler system in the handset terminal. Each voice scrambler system includes two voice scrambling circuits that are employed to scramble and descramble audio signals that are sent and received to the base station or the handset terminal, as will be discussed in more detail with reference to FIG. 1.

During the operation in the scrambling mode, the base station and the handset terminal transmit and receive the audio signals in a scrambled form. This scrambling technique prevents other devices in the vicinity of the cordless phone from receiving the audio signals that represent the user's actual voice. For example, many baby monitor receivers operate in the same frequency range as the cordless phones. Thus, a baby monitor that operates in a close proximity to a cordless phone can receive the audio signals transmitted by the base station and the handset terminal. Without a scrambling system, the conversation carried by the cordless phone user can be heard by the receiver set of a baby monitor. However, when the cordless phone employs a voice scrambling system, the receiver set of the baby monitor may receive an audible signal, which cannot be understood.

Although the scrambling feature is highly desirable, many users of cordless phones have found the voice quality of the audio signals after scrambling and descrambling less than satisfactory. As will be explained in more detail, the scrambling and descrambling process employs what is known in the art as frequency inversion. This process of inverting audio signals once to scramble and inverting the signals again to descramble affects the quality of the speech to the extent that it has led to user dissatisfaction.

Many cordless phone manufacturers have attempted to alleviate the user dissatisfaction by providing cordless phones that operate in scrambling and non-scrambling modes. FIG. 1 illustrates a prior art exemplary scrambler circuit 10 that is employed in the base station and the handset terminal of a typical cordless phone. Accordingly, a switch 16 is employed to control the connection between the output terminal of frequency generator 18 to the input terminal of mixer 14. During the non-scrambling mode, switch 16 is opened so that the output signal of low pass filter 12 is not mixed with the carrier frequency generated by frequency generator 18. Since circuit 10 does not invert the input signal, $f_{in}$, the output signal of scrambler circuit 10 remains substantially the same as its input signal.

For voice scrambler systems that employ a switch 16 to turn "on" or "off" the frequency inversion process described above, the quality of speech transmitted to and received from the phone line during the non-scrambling mode is relatively better than during the scrambling mode. However, the quality of the audio signals in non-scrambling mode are still unsatisfactory to many users.

Thus, there is a need for a cordless phone that provides a satisfactory audio signal when it operates in its non-scrambling mode.

SUMMARY OF THE INVENTION

Briefly, in accordance with one aspect of the invention a cordless phone comprises a base station configured to receive audio signals from a phone line and to transmit audio signals to the phone line; a first voice scrambler circuit configured to scramble audio signals received from the phone line; a second voice scrambler circuit configured to descramble audio signals intended to be transmitted to the phone line; a handset terminal configured to receive audio signals from the base station and to transmit audio signals to the base station; a third voice scrambler circuit configured to scramble audio signals intended to be transmitted to the base station; a fourth voice scrambler circuit configured to descramble audio signals received from the base station; wherein the voice scrambler circuits include a bypass switch that when activated is adapted to couple audio signals from the input terminal of each scrambler circuit to the output terminal of each scrambler circuit via a bypass route.

Briefly, in accordance with another aspect of the invention, a voice scrambler circuit comprises a first low pass filter configured to receive an audio signal and provide a filtered version of the audio signal; a mixer adapted to mix the filtered version of the audio signal with a predetermined carrier frequency; a second low pass filter configured to receive the output signal generated by the mixer and provide the frequency inverted version of the audio signal; a bypass switch adapted to connect the input terminal of the voice scrambler circuit to its output terminal, wherein the bypass switch is further adapted to be activated by a control signal.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

DETAILED DESCRIPTION OF THE DRAWINGS

Figure 2:
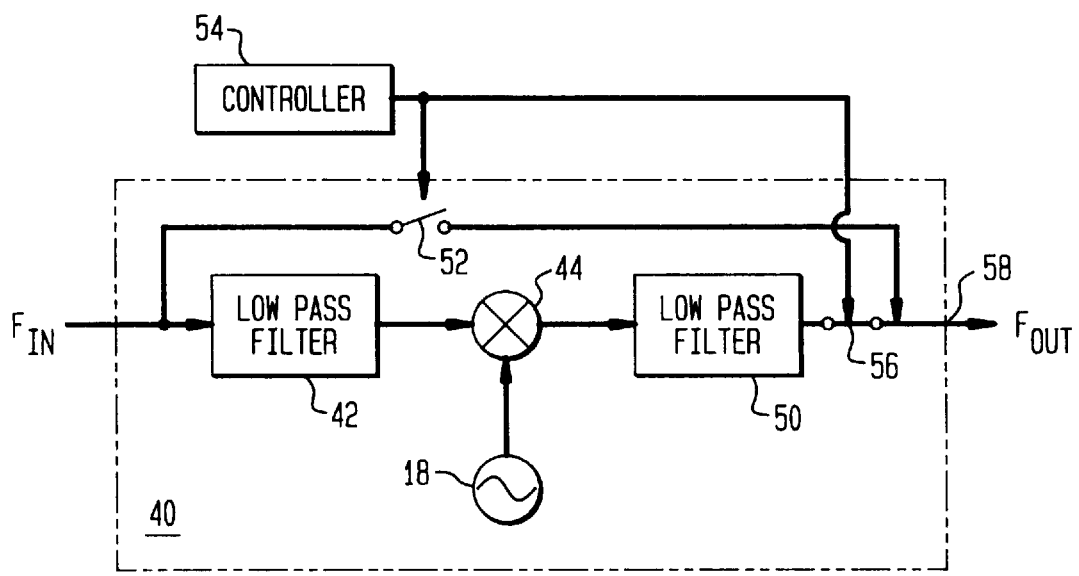
FIG. 2 illustrates one embodiment of a voice scrambler circuit in accordance with the present invention.

FIG. 2 illustrates a scrambler circuit, such as 40, in accordance with one embodiment of the invention, although the invention is not limited in scope to such a scrambler circuit. For example, other signal processing circuits configured to scramble an audio signal may be employed in accordance with the principles of the present invention.

Figure 1:
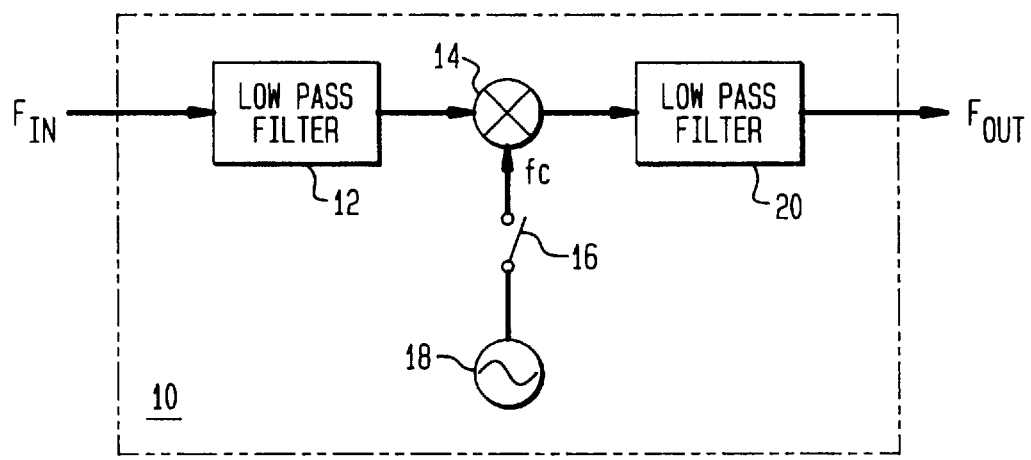
FIG. 1 illustrates a prior art voice scrambler circuit providing scrambling and non-scrambling modes.

Scrambler circuit 40 comprises a low pass filter 42, which is configured the same way as the scrambler circuit 10 discussed above in reference with FIG. 1. Thus, scrambler circuit 40 receives an audio signal $f_{in}$ via an input terminal of a low pass filter 42. Typically, the frequency range of the audio signal is about 300 Hz to 4 KHz. Low pass filter 42 is configured to remove all frequency components above its approximately 3.5 KHz cut-off frequency.

The output signal of low pass filter 42 is then mixed at a frequency mixer 44 with a carrier frequency signal, $f_c$, which is generated by a frequency generator 48. The carrier frequency signal, $f_c$, is adapted to be larger than the cut-off frequency of low pass filter 42. Mixer 44 generates a signal comprising the sum ($f_c+f_{in}$, and the difference ($f_c-f_{in}$) of the carrier frequency signal and the frequency components of output signal of low pass filter 42 ($f_c-f_{in}$). The output signal of mixer 44 is coupled to an input terminal of low pass filter 50. Low pass filter 50 is configured to remove the sum components of the output signal of mixer 44, leaving the difference component ($f_c-f_{in}$). The resultant output signal, $f_{out}$, of low pass filter 50 is the frequency inverted representation of the input frequency $f_{in}$, and includes frequency components substantially equal to ($f_c-f_{in}$. The process of scrambling input audio signals by employing scrambler circuit 10 is known as frequency inversion.

In order to descramble the resultant output signal, $f_{out}$, another scrambler circuit 40' (not shown), which comprises the same components as scrambler circuit 40, is employed to again invert the scrambled audio signals so as to generate the original audio signal at its output terminal. To this end, frequency components ($f_c-f_{in}$) are mixed with carrier signal $f_c$ resulting in a sum $f_c+(f_c-f_{in})$ and a difference $f_c-(f_c-f_{in})$ =$f_c$. Thereafter the difference component $f_c$ remains at the output of the second low pass filter. Thus, in the present context, the term voice scrambler circuit also refers to a voice descrambler circuit.

Since the upper limit of the audio band processed by the scrambling circuit and the carrier frequency are typically 200 to 300 Hz apart, it is desirable to employ high order multiple pole low pass filters in the scrambling circuit. In accordance with one embodiment of the present invention the low pass filters employed by voice scrambler circuits described herein comprise, for example, a 10 pole switched-capacitor circuit so as to provide substantially sharp frequency characteristics.

The input terminal of scrambler circuit 40 is coupled to its output terminal 58 via a control switch 52, which is configured to be activated or deactivated by a control signal that is generated by a controller 54. Furthermore, the output terminal of low pass filter 50 is coupled to output terminal 58 via a control switch 56. During operation, when controller 54 provides an activation signal, switch 52 closes and switch 56 opens, so as to provide a bypass route from the input terminal of scrambler circuit 40 to its output terminal. Audio signals provided to scrambler circuit 40 are thus bypassed upon activation of switch 52. When controller 54 provides a deactivation signal, switch 52 opens and switch 56 closes, and thus audio signals at the input of scrambler circuit 40 are routed through low pass filters 42 and 50 to output terminal 58.

Figure 3:
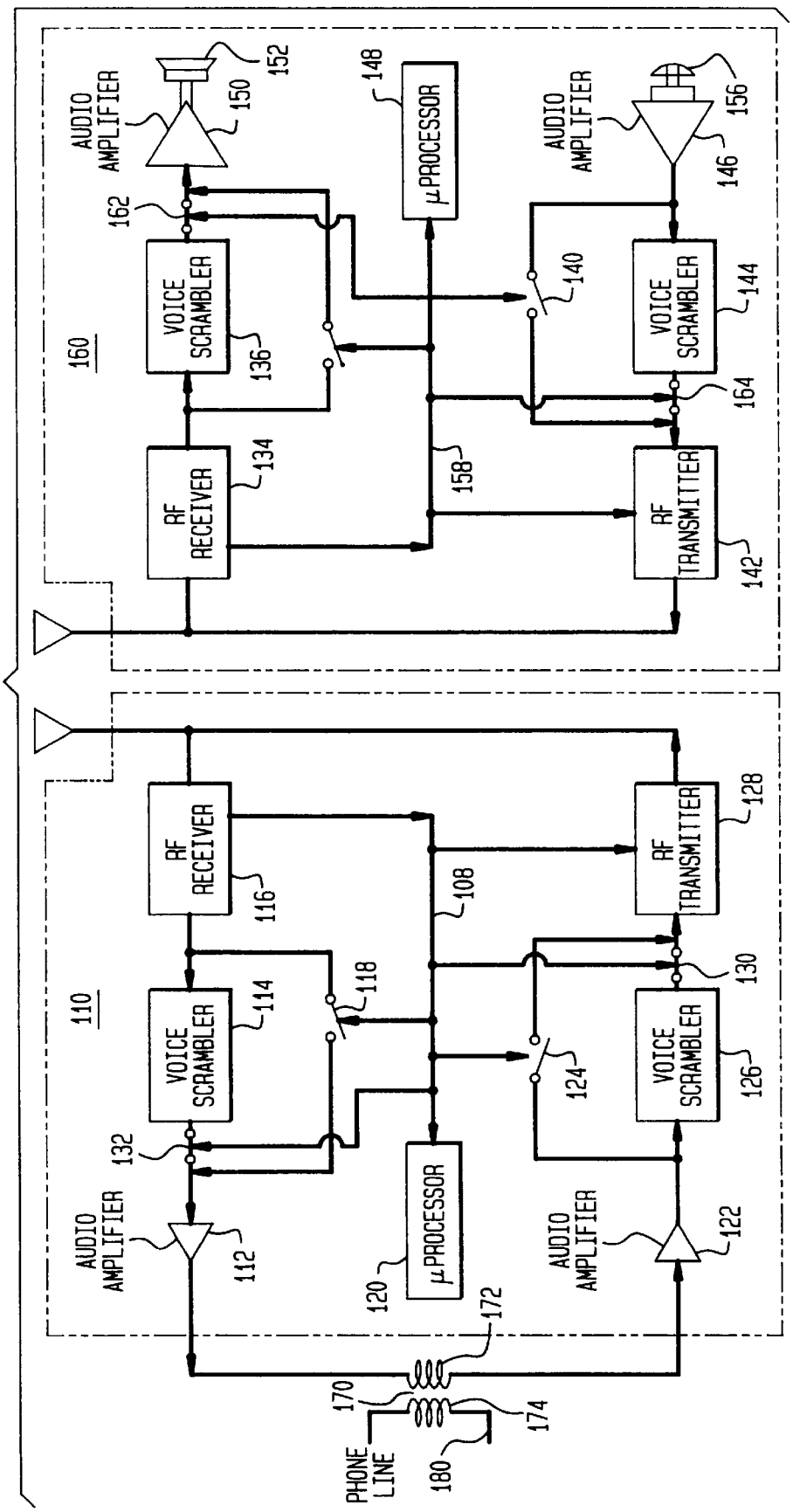
FIG. 3 illustrates a cordless phone system employing a voice scrambler system in accordance with the present invention.

FIG. 3 illustrates a cordless telephone 100 employing a voice scrambler system in accordance with one embodiment of the present invention. The cordless telephone comprises a base station 110 and a handset terminal 160. Base station 110 is coupled via a transformer 170 to a telephone line 180 which is provided to a user's premises by a telephone company. Base station 110 employs a transceiver for transmitting to and receiving signals from handset terminal 160. The base station includes a transmitter section comprising an audio amplifier 122, a voice scrambler circuit 126 and an RF transmitter 128. The input terminal of audio amplifier 122 is configured to receive audio signals provided by telephone line 180 via transformer 170. Audio amplifier 122 amplifies the audio signal received from telephone company lines and provides an amplified audio signal to an input terminal of a voice scrambler circuit 126.

In accordance with one embodiment of the present invention, voice scrambler circuit 126 is configured to be the same as voice scrambler circuit 40, described above in reference with FIG. 2. However, the invention is not limited to a voice scrambler embodiment described herein, and other voice scrambler circuits may be employed to scramble audio signals received from the output terminal of audio amplifier 122. The input terminal of voice scrambler circuit 126 is connected via a switch 124 to its output terminal. Furthermore, the output signal of voice scrambler 126 is coupled to its output terminal via a control switch 130. An output terminal of microprocessor 120 is coupled to an input terminal of switch 124 and switch 130 via a bus 108. Microprocessor 120 is configured to activate and deactivate switches 124 and 130 by sending a corresponding activation and deactivation signal to these switches. Upon activation of switch 124, switch 130 is deactivated, and a bypass route is formed from the input terminal of voice scrambler circuit 126 to the output terminal of voice scrambler circuit 126. This bypass route provides a signal path for routing amplified audio signals directly from the input terminal to the output terminal of voice scrambler circuit 126.

The output terminal of voice scrambler circuit 126 is coupled to an input terminal of a radio frequency (RF) transmitter 128. The output terminal of radio frequency (RF) transmitter 128 is coupled to an input terminal of an antenna 130.

Base station 110 also comprises a receiver section that is adapted to receive signals transmitted from handset terminal 160, and provide these signals to telephone line 180 via transformer 170. The receiver section of base station 110 includes a radio frequency receiver 116 adapted to receive audio signals received by antenna 130. Radio frequency (RF) receiver 116 provides audio signals to an input terminal of a voice scrambler circuit 114. Voice scrambler circuit 114, in accordance with one embodiment of the present invention, is configured to be the same as voice scrambler circuit 126. The input terminal of voice scrambler circuit 114 is connected via a switch 118 to its output terminal. An output terminal of microprocessor 120 is coupled to an input terminal of switch 118 via bus 108. Furthermore, the output signal of voice scrambler 114 is coupled to its output terminal via a control switch 132. Microprocessor 120 is configured to activate and deactivate switches 118 and 132 by sending a corresponding activation and deactivation signal to the switch. When switch 118 is activated, switch 132 is deactivated, and a bypass route is formed from the input terminal of voice scrambler circuit 114 to the output terminal of voice scrambler circuit 114. This bypass route provides a signal path for routing amplified audio signals directly from the input terminal to the output terminal of voice scrambler circuit 114.

Microprocessor 120 controls the operation of base station 110. Furthermore, the microprocessor is configured to provide handshaking signals to handset terminal 160, via bus 108, RF transmitter 128 and antenna 130. In accordance with one embodiment of the invention these signals may include information that indicates whether the cordless phone is operating in a scrambling mode or a non-scrambling mode.

The output terminal of voice scrambler circuit 114 is coupled to an input terminal of audio amplifier 112. The output terminal of audio amplifier 112 is coupled to the phone line via transformer 170.

Handset terminal 160 comprises a transmitter and a receiver section substantially similar to the configuration of base station 110 described hereinabove. However, the receiving section of handset terminal 160 provides an audio signal to an audio speaker 152, and the transmitter section of handset terminal 160 receives an audio signal from an audio microphone 156. Thus, handset terminal 160 comprises an RF receiver 134 configured to receive signals transmitted by base station 110 via an antenna 132. RF receiver 134 is coupled to a voice scrambler circuit 136 employing switches 138 and 162 as described in reference with voice scrambler circuits 114 and 126. The output terminal of voice scrambler circuit 136 is coupled to an input terminal of audio amplifier 150, which provides an audio signal to audio speaker 152.

Likewise, microphone 156 provides audio signals to an audio amplifier 146, which is coupled to an input terminal of a voice scrambler circuit 144 employing switches 140 and 164 as described in reference with base station 110. The output terminal of voice scrambler circuit 144 is coupled to an input terminal of a radio frequency transmitter 142, which is configured to provide audio signals to antenna 132 for transmission to base station 110. Microprocessor 148 is configured to activate and deactivate switches 138, 162, and 140, 164, by sending appropriate signals via bus 158. Furthermore, it is configured to transmit and receive handshaking signals from base station 110 via antenna 132 and bus 158.

During operation, the user of cordless telephone 100 determines to use the phone in either a scrambling mode or a non-scrambling mode. In accordance with one embodiment of the invention a control switch (not shown) is provided on the handset terminal to allow the user to switch between these two operating modes. For example the user selects a scrambling mode by employing the control switch on handset terminal 160. In response, microprocessor 148 generates a deactivation signal and provides that signal to switches 138 and 140 respectively via bus 158. In response, switches 162 and 164 are activated and assume a closed position. Microprocessor 148 also generates a scrambling mode indication signal that is transmitted to base station 110 via bus 158, RF transmitter 160, and antennas 132 and 130. Upon detection of the scrambling mode indication signal via RF receiver 116 and bus 108, microprocessor 120 also generates deactivation signal and provides that signal to switches 118 and 124 respectively. In response switches 130 and 132 are activated. As a result all audio signals transmitted between the handset terminal and the base station are processed by the voice scrambler circuits of the handset terminal and the base station.

For example, when the user speaks, audio signals corresponding to the user's speech are generated by microphone 156 and are amplified by audio amplifier 146. The amplified audio signals are then provided to voice scrambler circuit 144. The output signal of voice scrambler circuit 144 is a frequency inverted version of its input signal. The output signal of voice scrambler circuit 144 is then modulated and transmitted by transmitter 142 to base station 110 via antennas 132 and 130. RF receiver 116 demodulates the received signal and provides the signal to voice scrambler circuit 114. Voice scrambler 114 frequency inverts and descrambles the received signal to its original format and as such generates an audio signal that is ready to be transmitted via phone line 180. A portion of this audio signal is sent back to handset terminal 160 via the transmitter section of base station 110. This portion of audio signal which is originally generated by the user and is sent back for hearing by the user is known as side tone signal.

Briefly, the side tone signal is a portion of the audio signal that is generated by the audio microphone and transmitted back to the audio speaker of the cordless phone. Thus when a user speaks into the handset terminal of the cordless phone, the user's voice can be heard from the audio speaker. The side tone signal must be generated at the transformer 170 due to the nature of connection between the cordless phone and the telephone line. The side tone signal, therefore, passes through four scrambler circuits. For example, the user's voice is scrambled once by voice scrambler circuit 144. Upon its reception by base station 110 it is descrambled by voice scrambler circuit 114. A portion of the signal corresponding to the user's voice is sent back to the base station via transformer 170. This signal is then transmitted to handset terminal 160 via voice scrambler circuit 126. Upon its reception by handset terminal 160, this signal is sent to audio speaker 152 via voice scrambler circuit 136. As a result, the quality of the user's speech received by audio speaker 152 may be substantially unsatisfactory.

As illustrated in FIG. 3, when the cordless phone is operating in the scrambled mode, voice signals are passed through at least two voice scrambler circuits in each direction to or from the handset and the base station. As mentioned earlier, each voice scrambler employs two multi-pole switched-capacitor filters. As a result, the voice signals may experience a substantial degradation when passing through at least four multi-pole switched-capacitor filters.

For circumstances which the quality of the sound is more important to the user than privacy issues, the control switch may be set to non-scrambling mode, in accordance with the present invention. As a result, microprocessor 148 generates an activation signal to switches 138 and 144. In response switches 138 and 144 close, and switches 162 and 164 open. Signals provided to voice scrambler circuits 136 and 144 are respectively bypassed and as a result no voice scrambling takes place. Microprocessor 148 also transmits a non-scrambling mode signal to microprocessor 120, in response to which, microprocessor 120 generates activation signals to switches 118 and 124. In response switches 118 and 124 close, and switches 130 and 132 open. Signals provided to voice scrambler circuits 114 and 124 are respectively bypassed and as a result no voice scrambling takes place in the base station either. When in non-scrambling mode, the scrambling circuits, including mixer and low pass filters, are avoided resulting in little or substantially no distortion.

It will be appreciated that in accordance with the principles of the present invention, a cordless phone may be provided that allows communication both in scrambling and non-scrambling mode, whereas such communication in non-scrambling mode suffers from substantially small distortion, leading to better user satisfaction.

While only certain features of the invention have been illustrated and described herein, many modifications, substitutions, changes or equivalents will now occur to those skilled in the art. It is therefore, to be understood that the appended claims are intended to cover all such modifications and changes that fall within the true spirit of the invention.

I claim:

1. A cordless phone comprising:
   a base station configured to receive audio signals from a phone line and to transmit audio signals to said phone line said base station further including:
   a transmitter section comprising a first voice scrambler circuit coupled to said phone line so as to scramble audio signals received from said phone line;
   a receiver section comprising a second voice scrambler circuit coupled to said phone line so as to descramble audio signals intended to be transmitted to said phone line;

a handset terminal configured to receive audio signals from said base station and to transmit audio signals to said base station further including;
  a transmitter section comprising a third voice scrambler circuit coupled to an audio microphone so as to scramble audio signals intended to be transmitted to said base station;
  a receiver section comprising a fourth voice scrambler circuit coupled to an audio speaker so as to descramble audio signals received from said base station; and
  wherein said voice scrambler circuits of said base station are activated upon receiving a scrambler mode indication signal from said handset terminal and said voice scrambler circuits of said handset terminal are activated upon receiving a predetermined scrambling mode indication signal from said base station, said voice scrambler circuits include a bypass switch that when activated is adapted to couple said audio signals from the input terminal of each scrambler circuit to the output terminal of each scrambler circuit.

2. The invention in accordance with claim 1, wherein said handset terminal and said base station further comprise a first and a second microprocessor respectively each configured to control the activation and deactivation of each bypass switch corresponding to each voice scrambler circuit.

3. The invention in accordance with claim 2, wherein said microprocessor generates a deactivation signal to said bypass switches in response to said predetermined scrambling mode indication signal.

4. The invention in accordance with claim 3, wherein said bypass switches are configured to "open" in response to said deactivation signal.

5. The invention in accordance with claim 4, wherein said microprocessor generates a deactivation signal to said bypass switches in response to a predetermined non-scrambling mode indication signal.

6. The invention in accordance with claim 5, wherein said bypass switches are configured to "close" in response to said activation signal.

7. The invention in accordance with claim 6, wherein upon detection of said activation signal, one of said first and second microprocessor transmits said scrambling mode indication signal to the other microprocessor.

8. The invention in accordance with claim 7, wherein said scrambler circuit further comprises:
  a first low pass filter configured to receive an audio signal;
  a mixer coupled to an output terminal of said first low pass filter;
  a frequency generator adapted to provide a carrier frequency to said mixer, such that said mixer multiplies said carrier frequency with the output signal of said first low pass filter; and
  a second low pass filter configured to receive the output signal generated by said mixer.

9. The voice scrambler in accordance with claim 8 further comprising a second switch adapted to connect the output terminal of said second low pass filter to the output terminal of said voice scrambler, wherein said second switch is further adapted to be activated and deactivated by said predetermined control signal, such that when said bypass switch is activated said second switch is deactivated, and when said bypass switch is deactivated said second switch is activated.

10. The invention in accordance with claim 9, wherein said handset terminal further comprising:
  an audio microphone configured to receive user's speech signal and convert said speech signal to an audio signal;
  one of said voice scrambler circuits adapted to receive said audio signal from said microphone and configured to invert frequency components of said audio signal;
  a radio frequency transmitter adapted to receive said inverted frequency components from said voice scrambler circuit;
  an antenna adapted to transmit radio frequency signals generated by said radio frequency transmitter;
  a radio frequency receiver adapted to receive a radio frequency signal via said antenna, said radio frequency receiver further adapted to provide a frequency inverted audio signal to a second one of said voice scrambler circuits so as to transform said frequency inverted audio signal to its original form;
  an audio speaker adapted to receive said audio signal in its original form; and
  a microprocessor configured to control said bypass switches of said voice scrambler circuits so as to activate and deactivate said bypass switches.

11. The invention in accordance with claim 10, wherein said base station further comprising:
  one of said voice scrambler circuits adapted to receive an audio signal from a telephone line, and configured to invert frequency components of said audio signal;
  a radio frequency transmitter adapted to receive said inverted frequency components from said voice scrambler circuit;
  an antenna adapted to transmit radio frequency signals generated by said radio frequency transmitter;
  a radio frequency receiver adapted to receive a radio frequency signal via said antenna, said radio frequency receiver further adapted to provide an frequency inverted audio signal to a second one of said voice scrambler circuits so as to transform said frequency inverted audio signal to its original form and transmit said audio signal in its original form to said phone line; and
  a microprocessor configured to control said bypass switches of said voice scrambler circuits so as to activate and deactivate said bypass switches.

12. The invention in accordance with claim 11 wherein said microprocessor in said base station communicates with said microprocessor in said handset terminal via said antenna in said base station and said antenna in said handset terminal.

13. The invention in accordance with claim 12, wherein said bypass switches are configured to "open" in response to said deactivation signal, and said second switches are configured to "close" in response to said deactivation signal.

14. The invention in accordance with claim 13, wherein said bypass switches are configured to "close" in response to said deactivation signal, and said second switches are configured to "open" in response to said deactivation signal.

15. The invention in accordance with claim 14, wherein upon detection of said activation signal, one of said microprocessors transmits said activation indication signal to the other microprocessor.

* * * * *